Dec. 21, 1943.  E. G. BEIDERMAN  2,337,022
WELDING
Filed Jan. 13, 1936   3 Sheets-Sheet 3

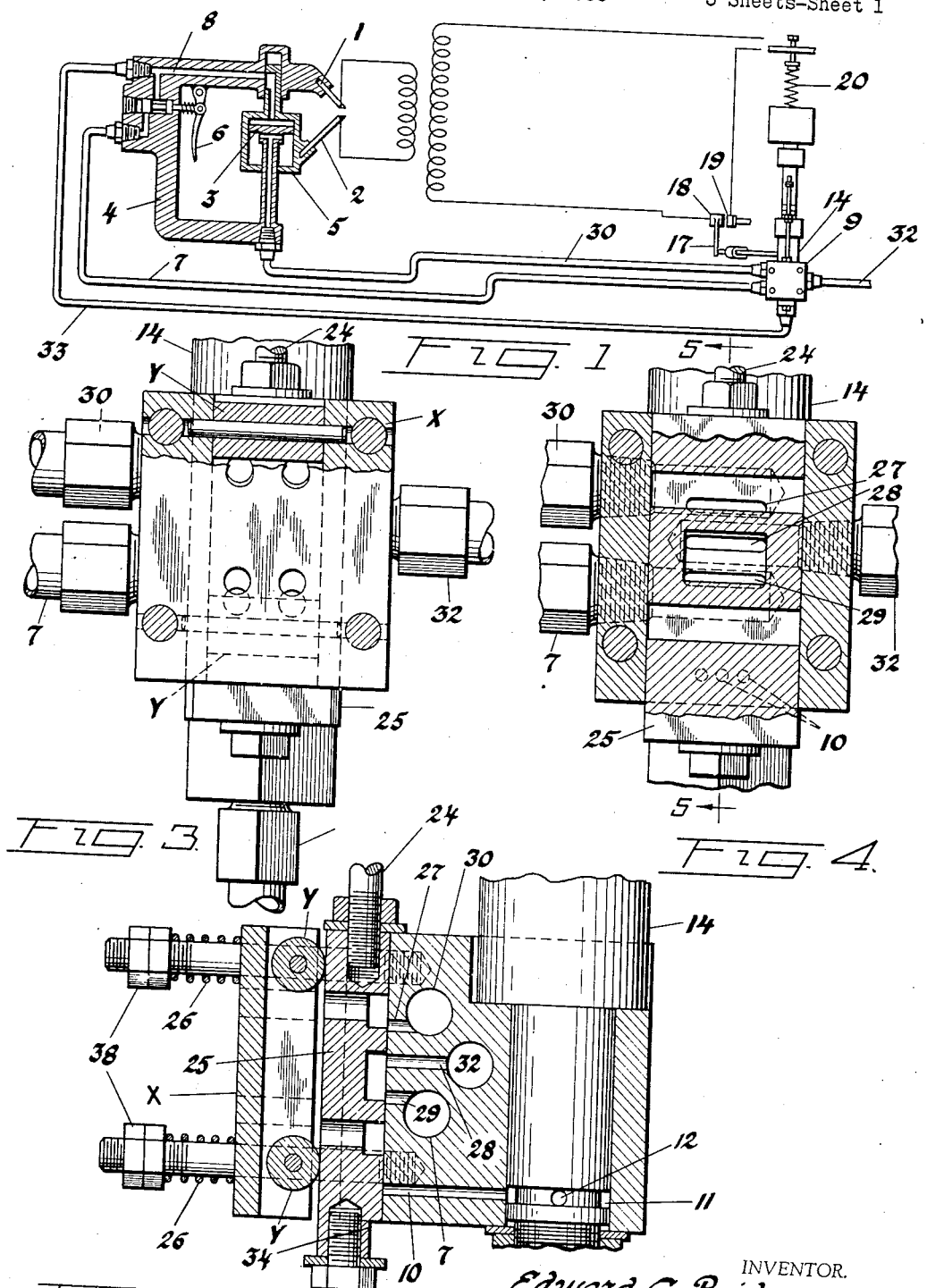

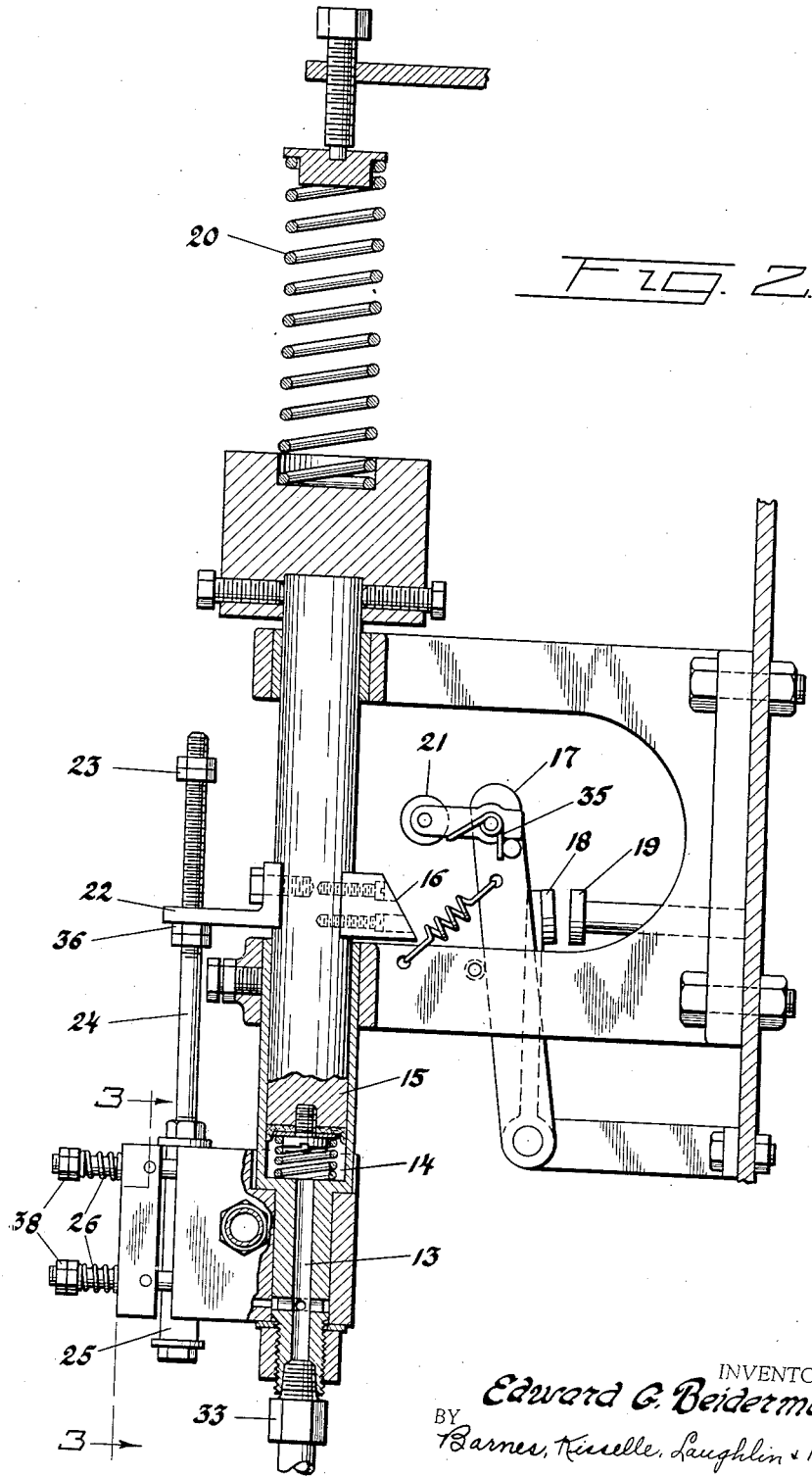

INVENTOR.
Edward G. Beiderman
BY
Barnes, Kisselle, Laughlin & Raisch
ATTORNEYS.

Patented Dec. 21, 1943

2,337,022

UNITED STATES PATENT OFFICE 2,337,022

WELDING

Edward G. Beiderman, Detroit, Mich., assignor to General Motors Corporation, Detroit, Mich., a corporation of Delaware Application January 13, 1936, Serial No. 58,916

10 Claims. (Cl. 219—4)

This invention relates to welding and has for its object an improved welding apparatus of the repeat type which is completely air operated and air controlled.

It is not new to provide a spot welder in which the repeat operations are electrically controlled or in which the repeat operations are effected by fluid pressure but in which the control of the fluid pressure is effected by an electrical timing device or a mechanical timing device such as a cam. It is the object of the present invention to provide an improved apparatus for accomplishing this purpose and which involves the use of a peculiar form of slide valve which can be attached directly to a cylinder which operates an electric timer.

It is the object of the present invention to provide a completely pneumatically operated repeat valve which is adapted to have an immediate connection with the timing cylinder and the quick air release of the timing cylinder.

In the drawings:

Fig. 1 is a schematic view of the apparatus.

Fig. 2 is an enlarged view, partly in section, of the valve and timer.

Fig. 3 is a section on the line 3—3 of Fig. 2.

Fig. 4 is a section through the slide valve.

Fig. 5 is a section on the line 5—5 of Fig. 4.

Figure 6:
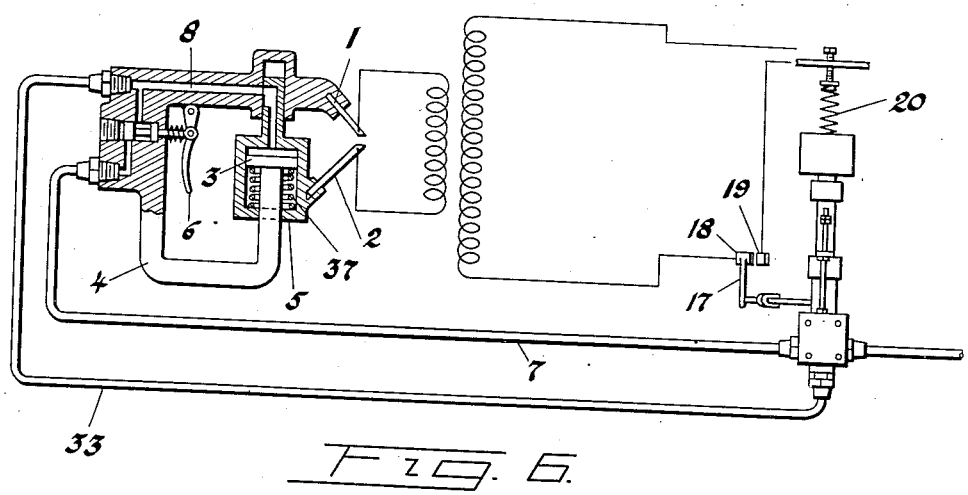
Figs. 6 and 7 are similar views of a single pneumatic action tool embodying my invention.

1 and 2 are the electrodes of the spot welder. 3 is a stationary piston which is rigidly connected with the yoke 4. It carries the electrode 1. The electrode 2 is secured to the movable cylinder 5 which can reciprocate with respect to the piston. When the trigger 6 is pulled towards the yoke, this connects the air line 7 with the air passage 8 which leads to the cylinder 5 above the stationary piston 3. This causes the electrodes to draw toward each other and onto the work. After the electrodes are stopped by the work, the pressure builds up back through the return conduit 33 to the cylinder 14 where it serves to push upwardly the piston 15 which carries the cam 16 that trips the switch lever 17 which brings the electric terminals 18 and 19 together temporarily. The timing of the welding current will depend upon the air pressure that is exerted against the countervailing pressure of the spring 20 and the slope and the length of the face of the cam 16.

When the cam 16 has passed or as the cam passes the roll 21, the collar 22 will engage the nut 23 on the stem 24 and lift the non-circular open face slide valve 25 which is pressed firmly against its seat by the springs 26. The springs press against block $x$ which carries rollers $y$ that bear against the back of the valve 25. This valve seat contains three passages, 27, 28 and 29. 27 connects with the conduit 30 which leads to the underside of the piston 3, and 28 with the air supply line 32. 29 connects with the conduit 7 which leads to the cylinder above the piston.

The operation is as follows: Trigger 6, being pulled towards the yoke, admits the air above the piston and brings the electrodes upon the work. The air pressure then backs up through the conduit 33 to the air contactor cylinder 14. This raises the air contactor piston 15, and cam 16 passes over the roller 21, switching on the current for the timed period. Then as the cam 16 drops off the end of the roller, the collar 22 contacts with the nut 23, pulling up the slide valve 25 and thereby causing the notch 34 to register with the exhaust passageway 10 connected by groove 11 and port 12 with the bottom of the cylinder, thereby immediately releasing the air pressure behind the piston 15 and allowing the spring 20 to promptly snap the cam 16 back past the roller 21 which moves out of the way by reason of the spring and pin arrangement 35. When the valve 25 is in its uppermost position, the air supply has been turned into the upper conduit 30 thereby sending the air below the piston 3 and thus pulling the electrodes apart. The spring 20 snaps the contactor piston 15 back and the collar 22 strikes the nuts 36 on the stem 24 and forces the valve down, again turning the air supply back into the conduit 7 which leads above the piston 3 which brings the electrodes together again, at the same time shooting the air into the air contactor cylinder to properly actuate the timing of the electric current.

As soon as the trigger 6 is released, the air that is supplied to the top of the piston is cut off. The trigger should not cut off the air until the weld has been completed. This result would be accomplished by not releasing the trigger until the weld is completed—a matter of observation, or some form of non-beat control can be adopted to see that the cutting off of the air does not take effect until the welding current is off. It is not necessary to describe or show such a form of device in connection with my invention.

Figure 7:
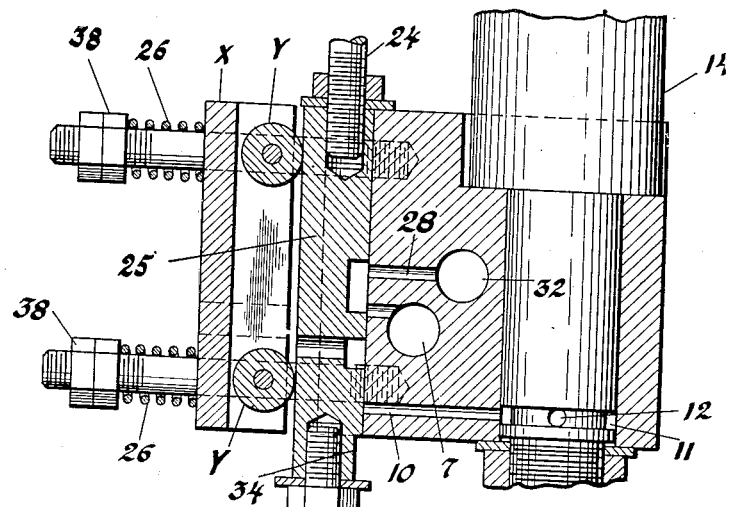

In Figs. 6 and 7 I have shown a modified form of the invention in which a spring 37 takes the place of the air line 30 at the bottom of the piston. This is a single action welding tool where air is on one side and a spring on the other. Hence the sliding valve 25 is the same except that the port 27 which leads to the conduit 30 is omitted, and consequently the arrangement of the recesses or passageways in the valve 25 is slightly different because no connection has to be made with this port 27 and the air supply port 28, and no exhaust from this port 27 is required. Otherwise the action is exactly the same.

By combining the valve directly with the air contactor cylinder I make the one valve distribute the air as required by the apparatus and also at the same time give a quick release of the air in the timing cylinder so that there will be absolutely no lag of the timing piston and hence an error in the timing. I also use the piston in the timing cylinder to directly operate the slide valve and hence no extra cylinder and piston is required for this purpose.

I find that this particular form of slide valve is very well adapted for the purpose by using the flat slide valve and the flat slide valve seat—at least by departing from the conventional cylindrical valve and cylinder a strong pressure can be used to press the sliding valve to its seat. This is afforded by the springs 26 in which the pressure can be adjusted by the nuts 38. This is extremely important as it makes sure that there is no leak; it automatically keeps the valve to its seat regardless of wear; and if too heavy an oil gets in between the valve and its seat the valve does not bind in the cylinder as the springs are simply moved slightly farther out and the pressure slightly increased.

What I claim is:

1. In a repeat welder, the combination of a pair of electrodes movable relatively to each other by the aid of fluid pressure, means for supplying fluid pressure to actuate the electrodes for such relative movement, means for supplying electrical energy to said electrodes, means for timing the supply of electrical energy to said electrodes, means for turning on the fluid, and means operated by the fluid pressure so turned on for in turn controlling the turning on and release of the fluid giving relative movement to the electrodes, said means being adjacent the timing means and operated by the timing means.

2. In a repeat welder, the combination of a pair of electrodes movable relatively to each other by the aid of fluid pressure, means for supplying fluid pressure to and actuating the electrodes for such relative movement, means including a piston operated by the back pressure of the fluid when the electrodes encounter the work for supplying electrical energy to said electrodes and for timing the electrical energy, fluid control means for turning on or off the fluid, and means operated by the fluid pressure so turned on for in turn controlling the turning on and release of the fluid giving relative movement to the electrodes, said means being adjacent the timing means and operated by the timing means, the travel of the fluid operated piston of the timing means operating said second mentioned fluid control means.

3. In a repeat welder, the combination of a pair of electrodes movable relatively to each other by the aid of fluid pressure, means for supplying fluid pressure to and actuating the electrodes for such relative movement, means for supplying electrical energy to said electrodes, means operated by the said fluid pressure for timing the supply of electrical energy to said electrodes, and a valve for turning on and releasing the fluid giving relative movement to the electrodes, said valve being operated by the timing means.

4. In a repeat welder, the combination of a pair of electrodes movable relatively to each other by the aid of fluid pressure, means for supplying fluid pressure to and actuating the electrodes for such relative movement, means for supplying electrical energy to said electrodes, means including a piston operated by the said fluid pressure for timing the supply of electrical energy to said electrodes, and a valve for controlling the fluid for turning on and releasing the fluid giving relative movement to the electrodes, said valve being adjacent the timing means and operated by the timing means, the said valve connected so that the movement of the piston of the timing means controls said valve.

5. In a repeat welder, the combination of a pair of electrodes movable relatively to each other by the aid of fluid pressure, means for supplying fluid pressure to and actuating the electrodes for such relative movement, means for supplying electrical energy to said electrodes, means including a pressure relief and a piston operated by the fluid pressure for timing the supply of electrical energy to said electrodes, and a valve for controlling the turning on and releasing of the fluid giving relative movement to the electrodes, the said valve being immediately adjacent to the fluid-operated timing means and connected so that the movement of the piston of the timing means controls said valve, and the movement of the valve in turn will control the said relief of the pressure behind the piston of the timing means.

6. In welding apparatus having relatively movable electrodes arranged in an electric circuit, means actuated by fluid pressure for relatively moving the electrodes into engagement with the work, means for moving the electrodes out of engagement with the work upon a drop in the fluid pressure, means also actuated by fluid pressure for making the electric circuit to the electrodes in timed relation to relative movement of the electrodes into engagement with the work and for breaking the electric circuit prior to relative movement of the electrodes out of engagement with the work, means controlling the flow of fluid pressure to both of said fluid pressure actuated means and operable to successively supply fluid pressure to and exhaust the same from both of the latter means at regular intervals, means for regulating the control means to vary the elapsed time between said intervals and for varying the length of time the electrodes are maintained into engagement with the work, means for varying the interval of closing of the circuit by the circuit controlling means, and means for varying the time interval between closing of the circuit and opening of the same.

7. In a welder, the combination of means for supplying fluid pressure, a movable member functioning in each operation of said welder, means for moving said member by the aid of said fluid pressure, means for supplying electrical energy including a contactor or timer having a movable part, and a control for said fluid pressure operating said movable member including means operated by the movement of said contactor.

8. In a welder, the combination of means for supplying fluid pressure, a movable member functioning in each operation of said welder, means for moving said member by the aid of said fluid pressure, means for supplying electrical energy including a contactor or timer having a movable part, and a control for said fluid pressure operating said movable member including a valve operated by the movement of said contactor.

9. In a welder, the combination of means for supplying fluid pressure, a movable member functioning in each operation of said welder, means for moving said member by the aid of said fluid pressure, means for supplying electrical energy including a contactor or timer having a movable part, and a control for said fluid pressure operating said movable member including a valve operated by the movement of said contactor, said contactor having an arm, and said valve a stem, the said arm cooperating with said stem to operate the valve.

10. In a welder, the combination of means for supplying fluid pressure, a movable member functioning in each operation of said welder, means for moving said member by the aid of said fluid pressure, means for supplying electrical energy including a contactor or timer having a movable part, and a control for said fluid pressure operating said movable member including a valve operated by the movement of said contactor, said contactor having an arm, and said valve having a threaded stem encompassed by said arm and provided with a pair of nuts on the threaded portion of said stem for engaging the arm to move the valve.

EDWARD G. BEIDERMAN.